(12) United States Patent
Lin et al.

(10) Patent No.: US 6,487,702 B2
(45) Date of Patent: Nov. 26, 2002

(54) AUTOMATED DECOUPLING CAPACITOR INSERTION

(75) Inventors: Chen Li Lin, Burlington, MA (US); Joel Grinberg, Newton, MA (US); Joseph Siegel, Shrewsbury, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 75 days.

(21) Appl. No.: 09/823,710

(22) Filed: Mar. 30, 2001

(65) Prior Publication Data

US 2002/0144217 A1 Oct. 3, 2002

(51) Int. Cl.[7] ............................................. G06F 17/50
(52) U.S. Cl. ................................................ 716/4; 716/8
(58) Field of Search ....................................... 716/1, 4–9

(56) References Cited

U.S. PATENT DOCUMENTS 6,253,359 B1 * 6/2001 Cano et al. ..................... 716/6

* cited by examiner

*Primary Examiner*—Tuan T. Lam
*Assistant Examiner*—Long Nguyen
(74) *Attorney, Agent, or Firm*—Lahive & Cockfield, LLP

(57) ABSTRACT

A system and method for automatically selecting decoupling capacitors for an electronic device. The system determines a localized drive strength for each component in the electronic device. Based on a summation of drive strengths for components in a given area of the electronic device, the system determines whether a decoupling capacitor is necessary to provide local power bus stability.

34 Claims, 7 Drawing Sheets

AUTOMATED DECOUPLING CAPACITOR INSERTION

TECHNICAL FIELD OF THE INVENTION

The present invention generally relates to a power system for an electronic device and more particularly, to the insertion of decoupling capacitors to reduce voltage variations in a power system.

BACKGROUND OF THE INVENTION

The continuing push to increase the operating speed of an integrated circuit while at the same time lowering the integrated circuit's bus voltage has created the need for an integrated circuit power bus having higher current capability and tightly toleranced voltage levels. The extremely rapid switching rates of the discrete components which make up current integrated circuits can cause current transients on the power bus lasting into the nanoseconds. By contrast, the typical power supply driving the power bus has a current transient reaction time in the microseconds. Moreover, the lowering of the logic voltage levels requires a power bus to deliver a stable voltage signal having a minimum of voltage level variation. Consequently, power bus stability, in terms of current response and voltage level fluctuation, becomes a significant issue in the design of an integrated circuit.

One manner in which the issue of power bus stability has been addressed is with the insertion of decoupling capacitors between the power bus and the logical components making up an electronic device. A step like function is the conventional manner in which decoupling capacitors are inserted into the electronic device to provide power bus stability. In this approach, decoupling capacitors are placed into an electronic device layout using a sequence of steps to produce a grid-like decoupling capacitor layout. Consequently, the structured placement of the decoupling capacitors adds power bus stability, but at the cost of an increase in the area required for the layout of the electronic device. In addition, the step like placement of decoupling capacitors introduces gate placement constraints on the design and the designer. Such constraints include where to place logical components having timing limitations and the often difficult task of maintaining optimum wire lengths derived by the quadratic placer.

The structured placement of decoupling capacitors also hinders the electronic device that utilizes control blocks of random logic. The reason being the random switching of the components that makes up a control block of random logic. Because of the random switching of the components, it is difficult to measure average power consumption. Thus, the control block of random logic having above-average power consumption does not have the properly sized decoupling capacitance to support its power consumption needs. Consequently, the control block of random logic having an above average consumption is prone to event upsets caused by power bus instability.

SUMMARY OF THE INVENTION

The present invention addresses the above-described limitations of the conventional structured placement of decoupling capacitors in an electronic device. In particular, the present invention provides a drive strength control facility for evaluating the localized power consumption of components in an electronic device in order to determine the decoupling capacitor requirements of the design.

In one embodiment of the present invention, a method is practiced that provides a representation of an electronic device that contains one or more cells, where each cell can contain a single logical component of the electronic device. Based on the logical component contained in a cell, the drive strength facility is able to determine a drive strength for the selected cell. The drive strength calculated for the selected cell represents the current necessary to drive the logical component of the cell under full load conditions.

By grouping cells located in proximity to each other and summing the drive strengths of each cell in the group, a cumulative drive strength for the group of cells is determined. Should the cumulative drive strength for the group of selected cells exceed a defined threshold, the selected cells are flagged as requiring a decoupling capacitor.

Once the drive strength facility has identified the cell groupings requiring decoupling capacitors, the flagged cells are again examined by the drive strength facility. In this examination, the drive strength facility determines if sufficient area is available to insert a decoupling capacitor within a specified distance of the cell grouping. If component density in the particular cell grouping prohibits placement of a decoupling capacitor, the drive strength facility reviews the layout of the electronic device to determine whether sufficient space may be created by the shifting of one or more cells in a particular row.

The above-described approach avoids the problems associated with placing decoupling capacitors in a structured sequential manner. The present invention reduces decoupling capacitor usage, which can result in a design cost reduction, along with a reduction of area in electronic device allocated to decoupling capacitors, and also allows a circuit designer to target an area of an electronic device that may be susceptible to event upsets caused by voltage level variations on the power bus. As a result, the electronic device may have a smaller overall profile, or alternatively, may be enhanced with additional capability or functionality without increasing device size.

In accordance with another aspect of the present invention, a method is practiced for determining the decoupling capacitor needs of an electronic device that considers which cells within a cell grouping are active during a given clock phase. In this way, total component area in the cell grouping does not drive the decoupling capacitor requirements for the grouping. By identifying which logical components are active during a first phase of the clock cycle, and which logical components are active during the second phase of the clock cycle, results in a more accurate indication of current draw for the selected group of cells.

Thus, for a given cell grouping, the drive strength facility may calculate a first cumulative drive strength for the components in the cell grouping that are active during the first phase of the clock signal, and calculate a second cumulative drive strength for the components in the grouping that are active during the second phase of the clock signal. If the first cumulative drive strength exceeds a first threshold value, the group of cells is flagged to indicate the requirement of a decoupling capacitor. In like manner, if the second cumulative drive strength exceeds a second threshold, the cells are flagged to indicate the need of a decoupling capacitor. As a result, the sizing of the decoupling capacitor is based on current draw as opposed to total surface area consumed by the selected components.

In accordance with a further aspect of the present invention, a system is provided for determining the decoupling capacitor usage requirements of a selected electronic device. The system includes a display to view a layout of the electronic device, an input device for use by a system operator, a processor for executing instructions in response from the system operator, and a drive strength facility for determining the decoupling capacitor needs for the electronic device represented on the display. In response to input from the system operator, the drive strength facility examines the electronic device layout and indicates to the system operator a cell or a group of cells requiring a decoupling capacitor. The drive strength facility may indicate the cells requiring a decoupling capacitor by highlighting the cells in one or more colors, or by outlining the cells in one or more colored borders.

By providing a visual indication of the cells or group of cells requiring decoupling capacitors, the system operator may visually track the progress of the drive strength facility. In addition, the operator can monitor the placement of decoupling capacitors in the electronic device and intervene should a cell row of the design be too dense to insert a decoupling capacitor.

The above-described system allows decoupling capacitors to be placed in an electronic device layout with minimal impact to device timing requirements and wire length constraints. Consequently, the layout of timing sensitive logical components or level sensitive logical components does not have to be designed around a fixed decoupling capacitor pattern. The system provides the benefit of placing the decoupling capacitor where needed as dictated by the layout of the electronic device, thus avoiding the burden of having to insert decoupling capacitors in a structured sequential manner. .

In accordance with a further aspect of the present invention, a computer-readable medium provides instructions to an electronic device capable of reading the medium with a method for determining where to insert a decoupling capacitor in an electronic device using a calculated drive strength for one or more cells containing a component. Further, the computer-readable medium allows a computer system to distinguish between cells of logical components that are operative in a first clock phase from cells of logical components that are operative in a second clock phase. This method provides a more accurate drive strength calculation of the current necessary to drive the cell grouping under full-load conditions. By accurately predicting the drive strength required for a cell grouping, decoupling capacitors can then placed in or near the cell grouping identified as needing a decoupling capacitor. As a result, decoupling capacitor usage is minimized, which results in less area of an electronic device consumed by decoupling capacitors and an attributable cost savings.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides a decoupling capacitor placement mechanism for determining the localized decoupling capacitor placement needs of an electronic device. The decoupling capacitor mechanism may be local, or global in the sense that all of the client's computer systems, within a given network environment, may be able to access the decoupling capacitor placement mechanism. The mechanism is able to analyze an electronic device layout and determine were a decoupling capacitor is required and its proper size. The mechanism may perform the decoupling capacitor requirement analysis on an electronic device from a component level perspective, from a gate level perspective, or from a discrete transistor level perspective. The present invention may be fully automated so that the placement of decoupling capacitors requires no operator intervention or alternatively, the present invention may operate in a semi-automatic mode to automatically insert a decoupling capacitor under one set of conditions and to prompt a system operator to intervene under a different set of conditions.

Figure 1:
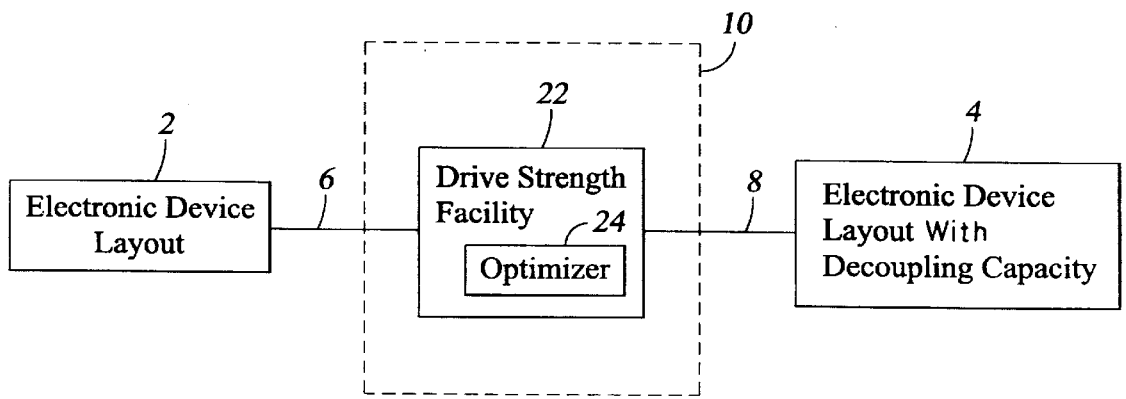
FIG. 1 is an illustrative block diagram depicting a drive strength facility receiving an electronic device layout and determining a decoupling capacitor layout for the received electronic device layout.

FIG. 1 depicts a drive strength facility 22 hosted on an electronic host apparatus 10 that is suitable for practicing the present invention. A suitable electronic host apparatus 10 includes a SPARC® work station operating the SOLARIS® operating system, both manufactured by Sun Microsystems of Palo Alto, Calif. Additional electronic host operating systems that are suitable for electronic host apparatus 10 include the UNIX® operating system, the LINUX® operating system, or any other suitable operating system. As illustrated in FIG. 1, an electronic device layout 2 is provided to the drive strength facility 22 of the electronic host apparatus 10. The electronic device layout 2 is delivered to the drive strength facility 22 over the data interconnect 6. The data interconnect 6 may be any suitable interconnection, such as, an Ethernet cable, a coaxial cable, a fiber optic cable, or any other suitable interconnect cable capable of carrying a data signal. When the drive strength facility 22 has finished placing the decoupling capacitors in the electronic device layout 2, the drive strength facility 22, using the data interconnect 8, forwards an electronic device layout with localized decoupling capacitors 4 to the provider of the electronic device layout 2.

The electronic device layout with localized decoupling capacitors 4 provided by the drive strength facility 22 is based on the localized drive strength needs of the logical components in the electronic device layout 2. Evaluating the localized drive strength needs of the electronic device layout 2 minimizes the number of decoupling capacitors required for the design, and as such, minimizes the need to modify the electronic device layout 2 to accommodate decoupling capacitors. One skilled in the art will recognize that the drive strength facility 22 may be a stand-alone mechanism that operates to evaluate an electronic device layout design for decoupling capacitor requirements once all the logical components of the design have been selected and laid out. Alternatively, the drive strength facility 22 may be an integrated part of the logical component selection and layout for the electronic device. By integrating the drive strength facility 22 with the selection and layout of the logical components, the drive strength facility 22, in real-time, can size and insert a decoupling capacitor in the electronic device layout 2, and hence avoid the need for future layout adjustments to accommodate decoupling capacitors.

Figure 2:
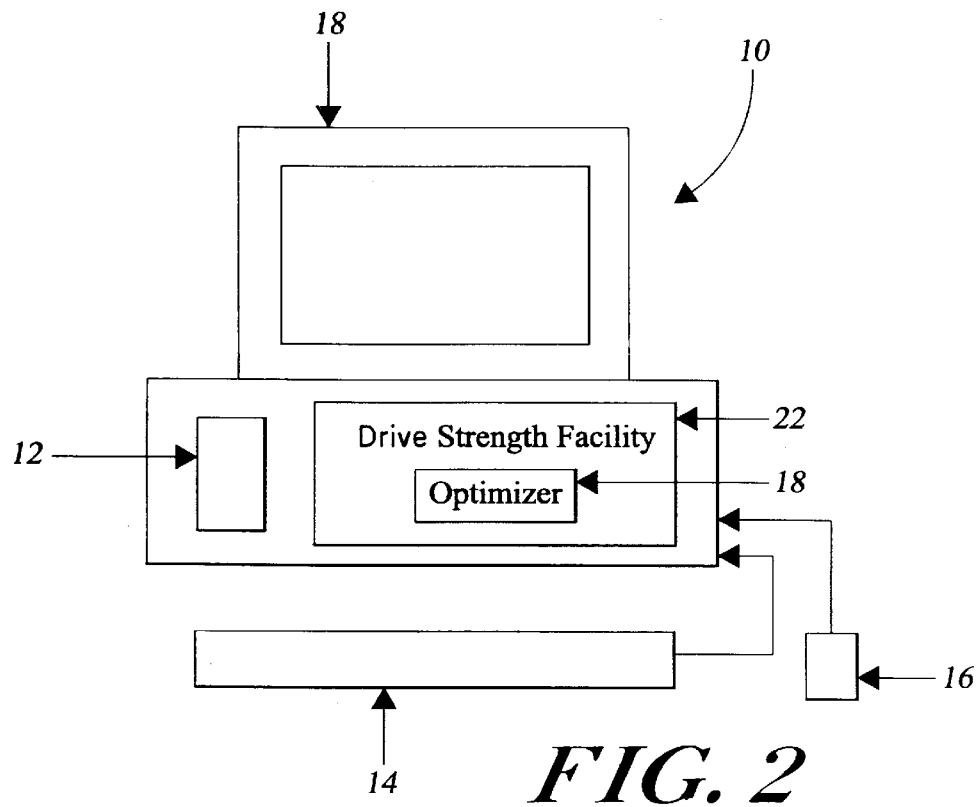
FIG. 2 illustrates an exemplary system suitable for hosting a drive strength facility.

With reference to FIG. 2, an electronic host apparatus 10 suitable for hosting a drive strength facility 22 is depicted. The illustrated electronic host apparatus 10 provides a user with a display 18, a keyboard 14, a pointing device 16, such as a mouse, and a storage element 12. Those skilled in the art will appreciate that the depiction of the electronic host apparatus 10 is intended to be merely illustrative and not limiting of the present invention. To evaluate the electronic device layout 2 for decoupling capacitor needs, the present invention requires that there be only one electronic host apparatus 10 to host drive strength facility 22. The storage element 12 is suitable for storing a number of electronic device layouts for example, 50 design layouts. One skilled in the art will appreciate that the storage element 12 may also be supplemented with a larger storage element, such as an optical juke box, a server, or any other storage device suitable for storing large volumes of data. Those skilled in the art will also appreciate that some aspects of the present invention may be practiced without an electronic host apparatus 10 having a device strength facility 22 resident within.

Figure 3:
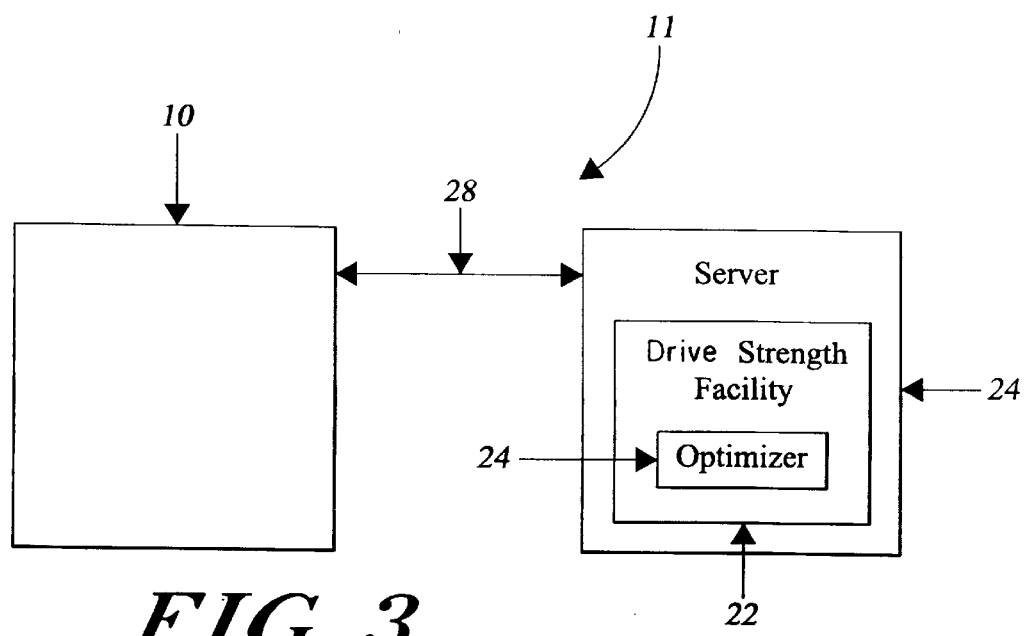
FIG. 3 depicts a distributed system that is suitable for practicing the illustrative embodiment.

FIG. 3 illustrates a communication network 11 that facilitates data exchange between the electronic host apparatus 10 and the server 26 that hosts the drive strength facility 22. In this depiction, the drive strength facility 22 resides on the server 26. In this manner, the drive strength facility 22 may be globally distributed or accessed by all authorized users in the communication network 11. In operation, the electronic host apparatus 10 forwards to the server 26, the electronic device layout 2 for evaluation by the drive strength facility 22. When the drive strength facility 22 has completed the decoupling capacitor analysis of the submitted electronic device layout 2, the server 26 returns to the electronic host apparatus 10 an electronic device layout with localized decoupling capacitors 4.

Those of ordinary skill in the art will recognize that in the configuration of FIG. 3, the user of the electronic host apparatus 10 may interact with the drive strength facility 22 to review the decoupling capacitor layout before the server 26 forwards the electronic device layout with localized decoupling capacitors 4. The user of the electronic host apparatus 10 may interface with the drive strength facility 22 on the server 26 using any commercially available web browser, or may use a graphical user interface that has been adapted for use with the server 26 and the drive strength facility 22.

In operation, the drive strength facility 22 divides the electronic device layout 2 into units of area, such as cells, in order to determine the localized decoupling capacitor requirements of an electronic device layout 2. Each cell may contain a single components utilized in the electronic device layout 2. To calculate a cumulative drive strength, the drive strength facility 22 utilizes a window concept to select a cell grouping of interest. Typical drive strength window sizing for drive strength analysis at the component die level is approximately 15 microns by 10 microns.

Once a cumulative drive strength has been calculated for a cell grouping, the drive strength facility 22 compares the calculated drive strength value with a drive strength threshold value. If the calculated drive strength value exceeds the drive strength threshold value, the drive strength facility 22 marks the cell grouping as violating a drive strength tolerance value, thus, requiring a decoupling capacitor. When the drive strength facility 22 has finished examining the selected group of cells for decoupling capacitor needs, the drive strength facility 22 slides the drive strength window over a new cell grouping and repeats the decoupling capacitor needs analysis. The size of the drive strength window used by the drive strength facility 22 may be set by the operator of the electronic host apparatus 10 based on the switching frequency of the component technology utilized in the electronic device. For example, the evaluation of an integrated circuit design having transistors switching at a frequency of about 200 MHz will require a window size that is considered small when referenced to a window size required to evaluate the layout of an integrated circuit design having transistors switching at a frequency of about 75 MHz.

The drive strength facility 22 may be configured to flag or mark a cell or a group of cells as requiring a decoupling capacitor using a colored border The color of a border may indicate the magnitude of the drive strength value for the cell or group of cells in excess of a threshold value. One skilled in the art will recognize that the drive strength facility 22 may utilize other techniques for flagging or marking cells of concern, such as highlighting the cells of concern with one or more colors to indicate the magnitude of the drive strength in excess of a drive strength threshold value.

Further, the drive strength facility 22 is able to detect within the drive strength window, the logical components that operate only during the A phase of the clock cycle and as such, calculate a drive strength value for the A phase components only. Likewise, the drive strength facility 22 is able to detect B phase operational logical components within the drive strength window and calculate a drive strength value for the B phase devices in the window. With the ability to differentiate between logical devices that operate in different phases of the clock cycle, the drive strength facility 22 provides a more accurate depiction of the localized power density for the group of selected cells. In addition, the drive strength facility 22 is able to provide a drive strength value for the combinational logical elements within the defined drive strength window. The drive strength facility 22 can compare the calculated drive strength value for the combinational logical elements to a combinational drive strength threshold value to determine if the configuration of combinational logic elements require a decoupling capacitor to support full-load conditions.

Figure 4:
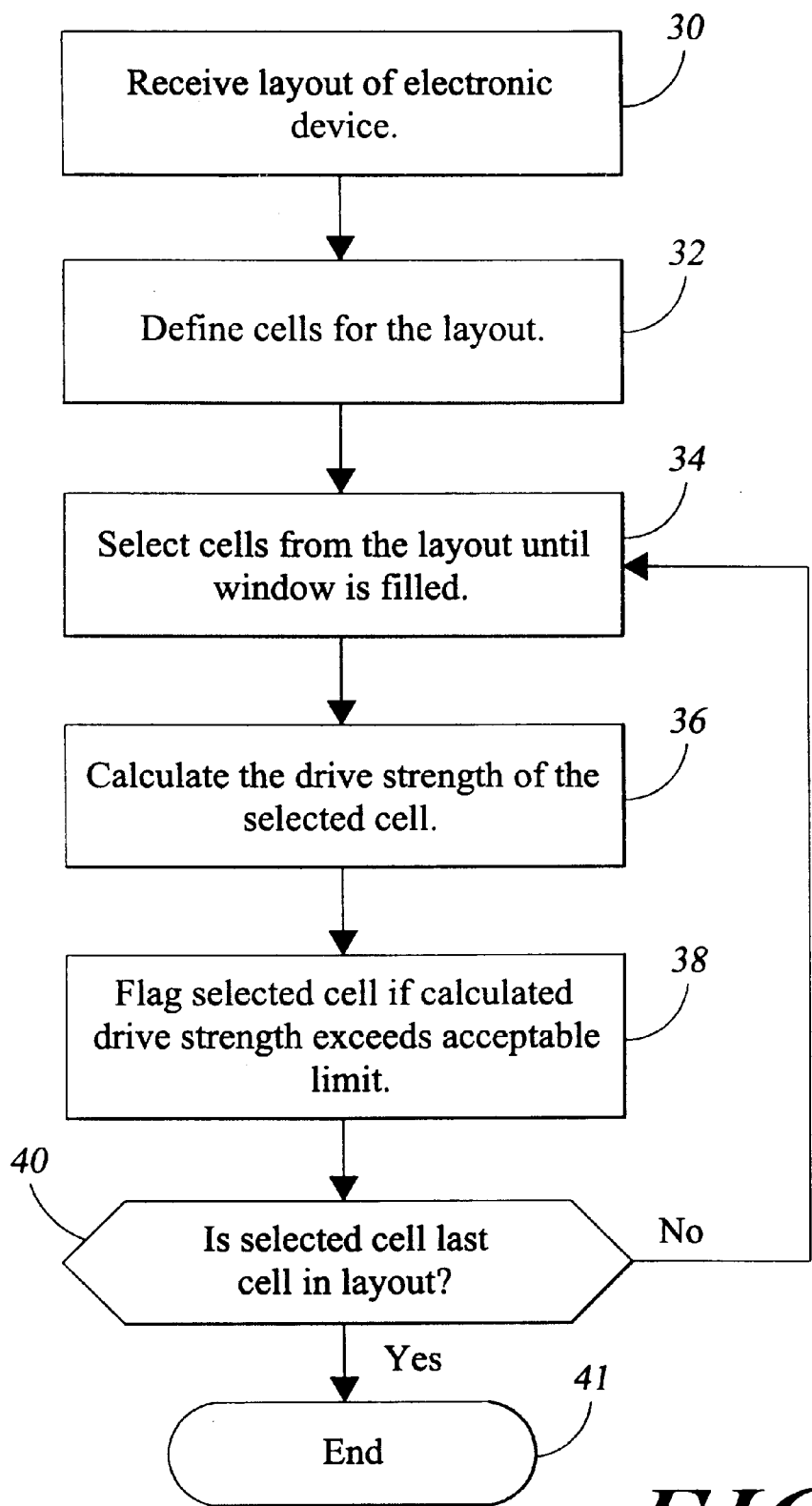
FIG. 4 is a flow chart illustrating the steps that are performed to determine the decoupling capacitor needs of an electronic device.

In the illustrative embodiment, the drive strength facility 22 receives an electronic device layout 2, in an electronic format, for determination and insertion of the device's decoupling capacitor requirements (step 30 in FIG. 4). Once received, the drive strength facility 22 views each logical component in the electronic device layout 2 as a cell (step 32 in FIG. 4). The cell size may vary depending on the switching frequency of the components utilized in the electronic device layout 2. The drive strength facility 22 then selects cells in close proximity to form a cell grouping until the selected cells have enough surface area to fill the drive strength window (step 34 in FIG. 4). A typical drive strength window size for an electronic device layout in die form is approximately 15 microns tall and approximately 10 microns wide.

The drive strength facility 22 is able to recognize the logical components within the cell grouping that are active only during a given clock phase. For example, the drive strength facility 22 can tally the drive strengths of the logical components within the window that are in their evaluate phase when the clock signal is in it's A phase to determine a cumulative A phase drive strength value. In like manner, the drive strength facility 22 can identify all of the logical devices within the drive strength window that have their evaluate phase during the B phase of the clock cycle and tally the cumulative drive strength value of the B phase logical components. Further, the drive strength facility 22 may also identify the logical elements within the drive strength window that are referred to as combinational elements, such as flip flops, decoders, multiplexes, NAND gates, NOR gates, or the like, and provide a separate cumulative drive strength value for the combinational logic elements. The ability of the drive strength facility 22 to compute a drive strength based on when a logical component is active provides a more accurate assessment of the power density requirements of the selected cells and avoids having to base localized decoupling capacitor needs solely on measured gate surface area.

Once enough cells have been grouped to fill the drive strength window, the drive strength facility 22 then calculates the cumulative drive strength value for the cell grouping and compares the cumulative drive strength value to a predefined drive strength threshold value (step 36 in FIG. 4). If a cumulative drive strength value exceeds the corresponding cumulative drive strength threshold value, the drive strength facility 22 flags the group of cells as violating a drive strength threshold value, hence, requiring a decoupling capacitor (step 38 in FIG. 4). The selected cells are flagged if the calculated cumulative drive strength value for the A phase devices exceeds an A phase device cumulative drive strength threshold. One skilled in the art will recognize that an A phase device is an electronic device that is active (i.e. evaluates) when the clock signal is in its A phase, where the term "A phase" refers to when the clock signal is at a logic "1" level. In similar fashion if the calculated cumulative drive strength value for the B phase devices exceed the B phase cumulative drive strength threshold the selected cells are flagged. Those skilled in the art will recognize that a B phase device is an electronic device that is active (i.e. evaluates) when the clock signal is in its B phase, where the term "B phase" refers to when the clock signal is at a logic "0" level. Moreover, if the calculated cumulative drive strength value for the combinational devices exceeds the cumulative drive strength threshold for the combinational devices the selected cells are flagged. In the event that the drive strength facility 22 determines that the cell grouping exceeds a cumulative drive strength threshold for more than one logic family type, the drive strength facility 22 flags the cell grouping to indicate the magnitude of the worst case cumulative drive strength calculation. The use of color coding to indicate a cumulative drive strength gives an operator viewing the analysis of the drive strength facility 22 an identifiable reference for determining a proper decoupling capacitor size.

Once the drive strength facility 22 has tallied the cumulative drive strength of the logical components within the drive strength window, and compared this value to the cumulative drive strength threshold values for the selected electronic device layout 2, the drive strength facility 22 moves the drive strength window to the next cell grouping (step 40 in FIG. 4). The drive strength facility 22 repeats this process until all logical components in the electronic device layout 2 have had their localized cumulative drive strength analyzed and compared to the cumulative drive strength threshold values that determine whether a decoupling capacitor is required (step 41 in FIG. 4). To save computation time, the drive strength facility 22 does not need to visit every single grid point in the drive strength window to analyze the cumulative drive strength of the selected cells. In addition, the drive strength facility 22 may move the drive strength window in the vertical direction of the electronic device layout 2 in half row increments to help reduce computation time.

Once the drive strength facility 22 has flagged all cells violating a cumulative drive strength threshold, the drive strength facility 22, utilizes one of two possible methods, to determine where to insert the required decoupling capacitor in support of the flagged cell grouping. In either technique, the goal of the drive strength facility 22 is to insert a decoupling capacitor as near as possible to a flagged cell grouping without having to shift cells the row of cells to the left or to the right. In this phase of the process, the drive strength facility 22 utilizes a window that is centered about the group of flagged cells, but can vary in length and width so long as the total surface area in the window does not exceed 100 microns. One skilled in the art will appreciate that the drive strength facility 22 may also operate in this phase using a fixed sized window, and the 100 micron surface area limit of the window may be increased or decreased to support the switching frequency of the transistors being utilized by the electronic device.

The first illustrative embodiment to automatically insert a decoupling capacitor to support a group of flagged cells violating a cumulative drive strength threshold provides the benefit of an expedited result. The first illustrative embodiment achieves this benefit by inserting a decoupling capacitor wherever sufficient space is available to do so. The second illustrative embodiment to automatically insert a decoupling capacitor in support of a group of flagged cells violating a cumulative drive strength threshold requires a longer period of time generate a final result than the first illustrative embodiment. The additional time that the second illustrative embodiment requires to insert a decoupling capacitor into the electronic device layout 2 is a result of the drive strength facility 22 ensuring the space constraints and the decoupling capacitance constraints of the electronic device layout 2 are optimized so that adjacent groups of flagged cells may benefit from a shared decoupling capacitor. The second illustrative embodiment provides the benefit of ensuring the electronic design layout 2 contains sufficient open space to insert all needed decoupling capacitors before altering the electronic design layout 2 in an attempt to create sufficient space. The details of the first illustrative embodiment for automatic insertion of a decoupling capacitor in the electronic design layout 2 and the details of the second illustrative embodiment for automatic insertion of a decoupling capacitor in the electronic design layout 2 are discussed below with reference to FIG. 5 and FIG. 8.

Figure 5:
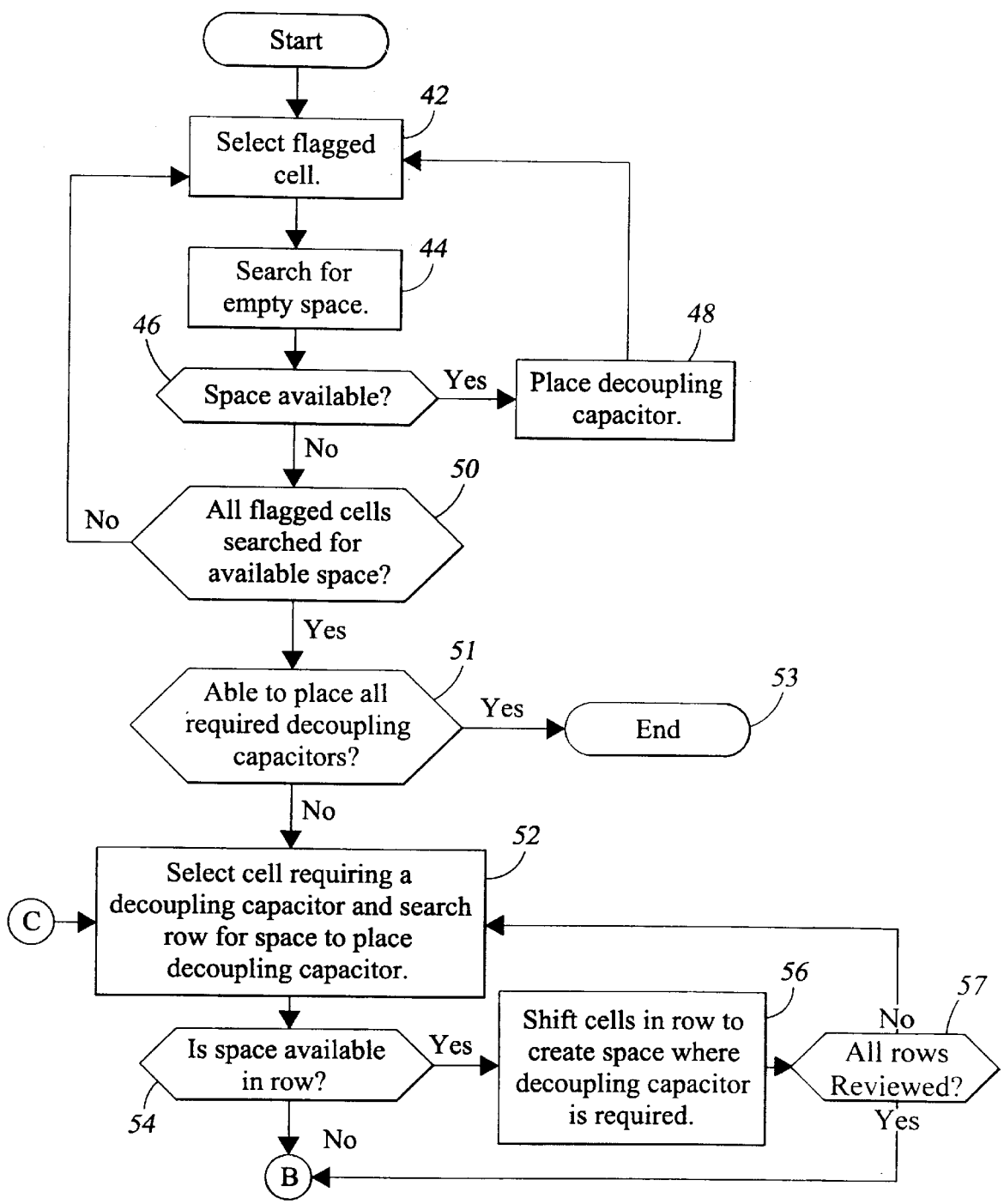
FIG. 5 is a flow chart illustrating the steps that are performed in a first illustrative embodiment of the present invention to insert a decoupling capacitor in an electronic device.

In the first illustrative embodiment to automatically insert a decoupling capacitor, the drive strength facility 22 using the 100 micron sized search window, selects a flagged cell grouping (step 42 in Figure) and searches within the perimeter of the window for space where an appropriately sized decoupling capacitor may be placed (step 44 in FIG. 5). If space is available within the 100 micron search window (step 46 in FIG. 5), the drive strength facility 22 inserts the appropriately sized decoupling capacitor in the open space (step 48 in FIG. 5). The size of the decoupling capacitor inserted is dependent on the cumulative drive strength value calculated for the flagged cell grouping. Once the drive strength facility 22 inserts the decoupling capacitor, the drive strength facility 22 moves the 100 micron search window to the next flagged cell grouping and repeats the search for open space in the newly selected group of flagged cells (step 42 in FIG. 5).

Should the drive strength facility 22 find that there is insufficient open area to insert a properly sized decoupling capacitor within the 100 micron search window (step 46 in FIG. 5), the drive strength facility 22 determines whether all flagged cell groupings have been reviewed for open space to insert a needed decoupling capacitor (step 50 in FIG. 5). If there is a flagged cell grouping that requires review, the drive strength facility 22 moves the 100 micron search window to the flagged cell grouping (step 42 in FIG. 5) and searches for open space to insert a decoupling capacitor (step 44 in FIG. 7. The drive strength facility 22 will continue in this manner until all the flagged cell groupings in the electronic device layout 2 are reviewed for open area to insert decoupling capacitors.

If the drive strength facility 22 can insert all the required decoupling capacitors, (step 51 in FIG. 5) the drive strength facility 22 ends the task of inserting decoupling capacitors (step 53 in FIG. 5). If the drive strength facility 22 inserts all the decoupling capacitors that it can, but flagged cell groupings still remain without decoupling capacitors (step 51 in FIG. 5), the drive strength facility 22 returns to the flagged cell groupings that lack adequate space and searches the row in which the selected flagged cell grouping is located for adequate space to insert a decoupling capacitor (step 52 in FIG. 5). If the drive strength facility 22 detects space in the row of the selected flagged group of cells to insert a decoupling capacitor (step 54 in FIG. 5), the drive strength facility 22 shifts cells in the row to the left or to the right to create an open space within the 100 micron search window placed over the flagged group of cells (step 56 in FIG. 5).

The drive strength facility 22 is able to shift cells in a row so long as the cell shift does not cause the row to exceed the boundaries of the electronic device layout 2 or interfere with the clock headers in electronic device layout 2. After shifting cells in the selected row to create an open space within the 100 micron search window, the drive strength facility 22 places the appropriately sized decoupling capacitor in the now available space (step 56 in FIG. 5) and moves to the next flagged group cells that are still marked as requiring a decoupling capacitor (step 57 in FIG. 5). If the drive strength facility 22 determines that there is insufficient space in the row to support a decoupling capacitor (step 54 in FIG. 5), the drive strength facility 22 indicates to the system operator that the flagged cell grouping requires a decoupling capacitor, but there is insufficient space in the row to insert a decoupling capacitor (step 58 in FIG. 6). Once the drive strength facility 22 has indicated to the system operator that no room remains in the row for placing a decoupling capacitor, the drive strength facility 22 determines whether any rows remain to be searched for open space (step 60 in FIG. 6).

The drive strength facility 22 continues in this manner until all the rows in the electronic device layout 2 are reviewed for available space. When the drive strength facility 22 determines that all rows where reviewed for open space (step 60 in FIG. 6), the drive strength facility 22 saves the decoupling capacitor insertion results to the storage element 12 and ends the decoupling capacitor insertion analysis (step 62 in FIG. 6).

Figure 6:
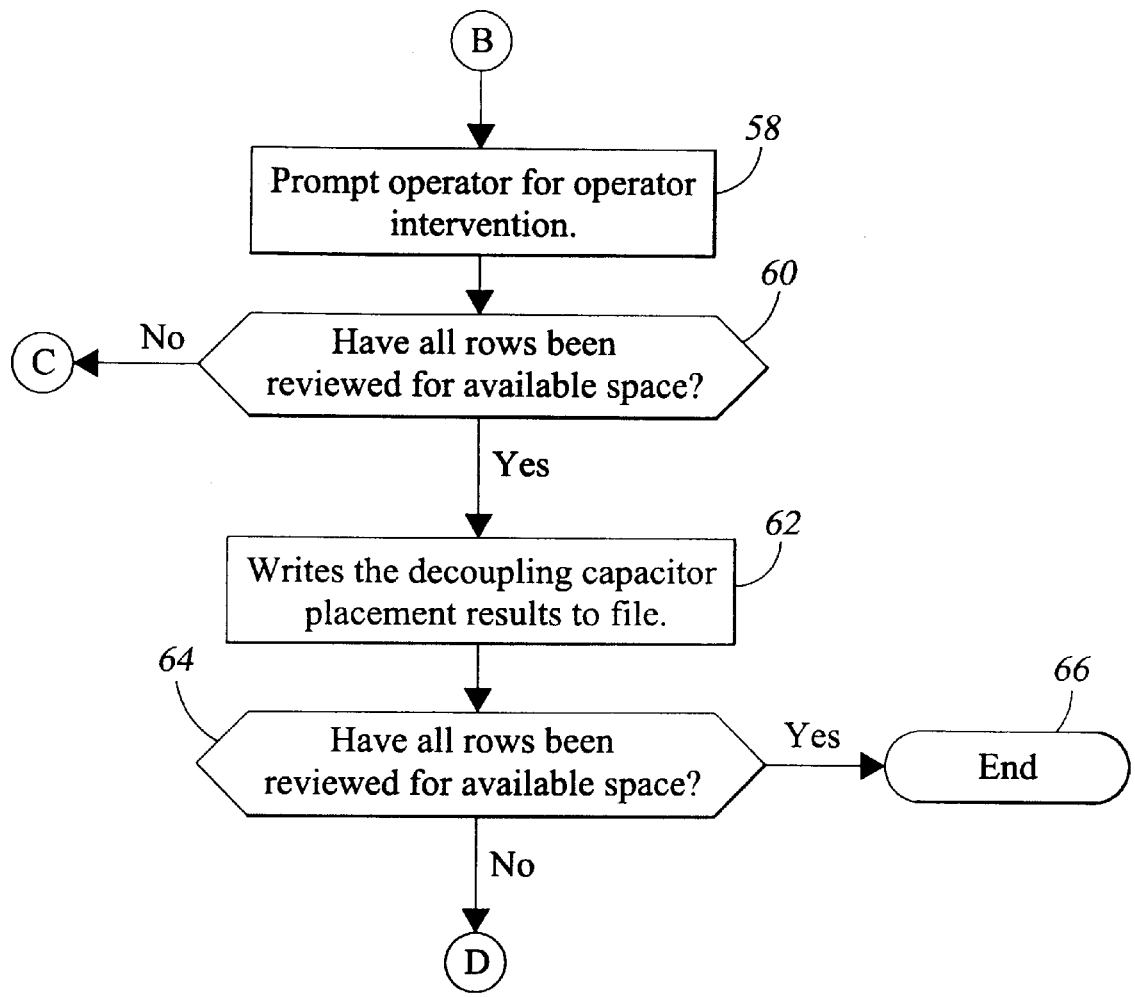
FIG. 6 is a continuation of the flow chart in FIG. 5.

If the drive strength facility 22 is able to insert all the decoupling capacitors needed by the electronic device layout 2 by shifting cells in a row to provide additional space, the localized decoupling capacitor insertion analysis is complete (step 66 in FIG. 6). If the drive strength facility 22 could not insert all the required decoupling capacitors needed by the electronic device layout 2 after shifting cells in a row to provide additional space (step 64 in FIG. 6), the drive strength facility 22 passes the space constraints, the capacitance constraints, and the inserted decoupling capacitor results to the linear optimizer 24 (step 66 in FIG. 7).

Figure 7:
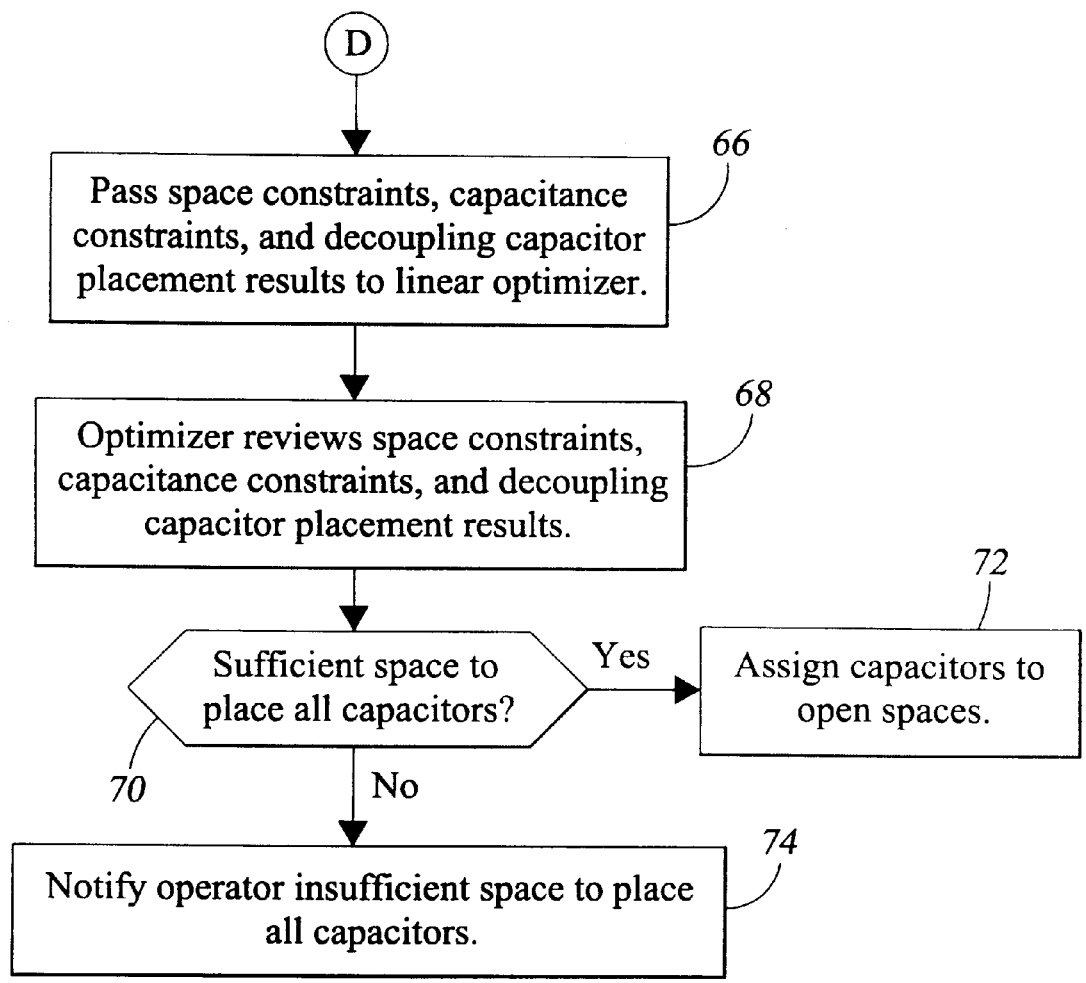
FIG. 7 is a continuation of the flow chart in FIG. 6.

The linear optimizer 24 utilizing a constraint based system of equations derives whether all needed decoupling capacitors for the electronic device layout 2 can be inserted given the space constraints of the electronic device layout 2 (step 68 in FIG. 7). The linear optimizer 24 uses the constraint based equations and the passed constraints to identify the flagged cell groupings that violate a drive strength threshold value and the location of space available to insert needed localized decoupling capacitors (step 68 in FIG. 7). As such, the linear optimizer 24 is able to determine which groups of flagged cells have space in common, that is, where is it possible for groups of flagged cells to share one or more localized decoupling capacitors. In addition, the linear optimizer 24 is capable of inserting multiple decoupling capacitors in the available space to provide a cumulative decoupling capacitance equal to or greater than the decoupling capacitance needed for an identified group of cells or groups of cells violating a drive strength threshold value.

If the linear optimizer 24 determines that sufficient space is available to meet the localized decoupling capacitor needs of the electronic device layout 2 (step 70 in FIG. 7), the linear optimizer 24 inserts the decoupling capacitors in the corresponding open spaces and prompts the operator when all decoupling capacitors have been inserted in the electronic device layout 2 (step 72 in FIG. 7). If the linear optimizer 24 determines that the electronic device layout 2 contains insufficient space to insert all needed decoupling capacitors (step 70 in FIG. 7), the drive strength facility 22 notifies the system operator that the electronic device layout 2 contains insufficient space to insert all needed decoupling capacitors (step 74 in FIG. 7).

Once the drive strength facility 22 has completed the localized drive strength analysis of the provided electronic device layout 2 and inserted as many required decoupling capacitors allowed by the open space constraints of the electronic device layout 2, operator intervention is required. At this point, the system operator may choose to expand the electronic device layout boundaries to provide additional area, or may choose to shift cells amongst rows in the layout, or may choose to partition larger cells that have unused open space into two or more smaller cells, in an attempt to provide sufficient space to insert any decoupling capacitors still required in the electronic device layout 2. If the system operator can provide the additional required space, the operator may insert the still needed decoupling capacitors into the electronic device layout 2 by instructing the drive strength facility 22 to insert a decoupling capacitor at a particular coordinate, or alternatively, may allow the drive strength facility 22 to re-evaluate the cells flagged as requiring decoupling capacitors.

Figure 8:
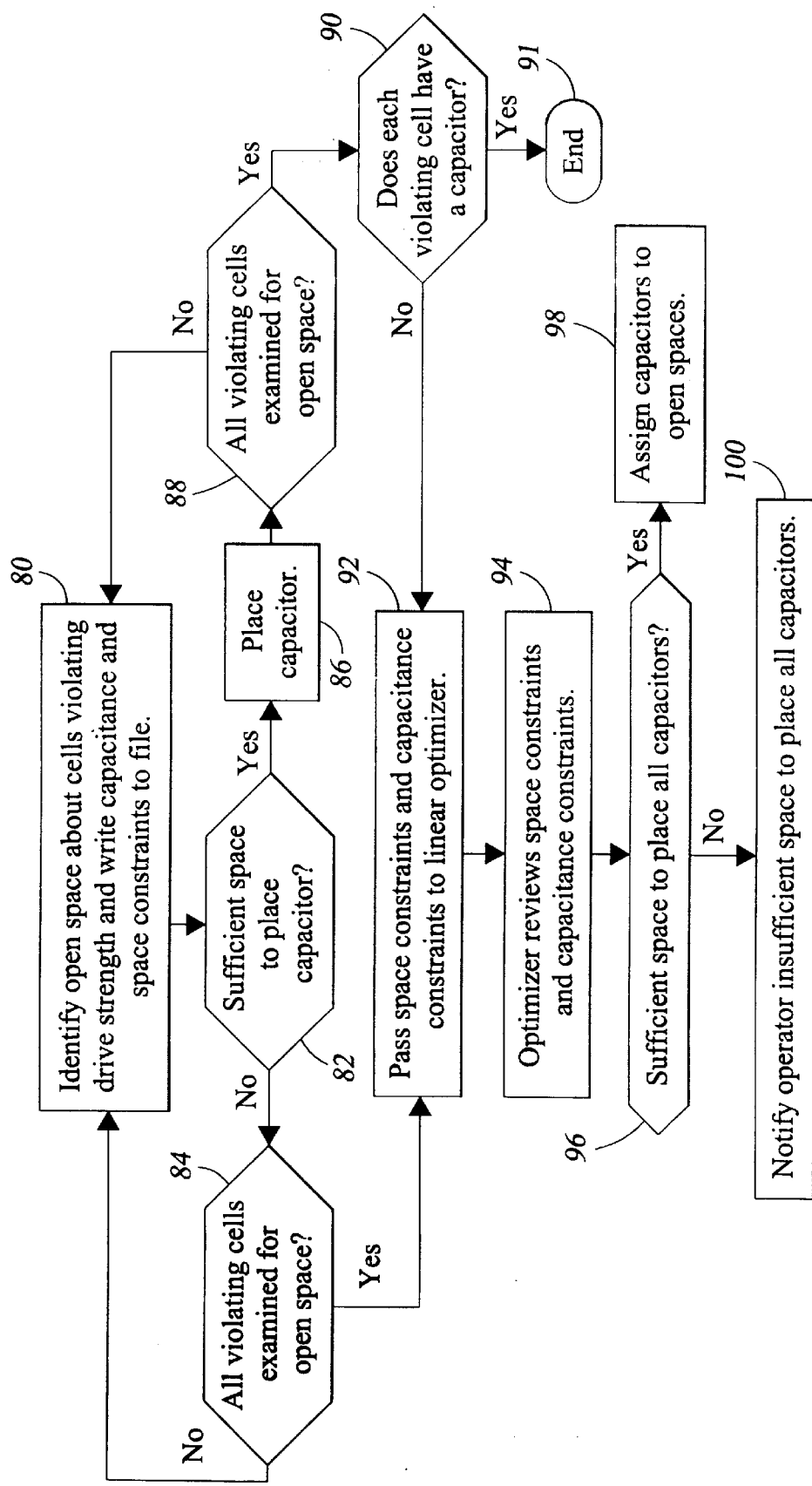
FIG. 8 is a flow chart illustrating the steps that are performed in a second illustrative embodiment of the present invention to insert a decoupling capacitor in an electronic device.

The second illustrative embodiment for inserting the localized decoupling capacitor needs of an electronic device layout 2 is depicted in FIG. 8. In the second illustrative embodiment to automatically insert a decoupling capacitor, the drive strength facility 22 using the 100 micron size search window, selects a flagged cell grouping that violates a drive strength threshold and identifies the open space constraints within the perimeter of the window suitable for placing a localized decoupling capacitor (step 80 in FIG. 8). Once the drive strength facility 22 determines the open space constraints, the drive strength facility 22 writes the space constraints and the decoupling capacitor needs for the selected group of cells violating a drive strength threshold to the storage element 12 (step 80 in FIG. 8). If the drive strength facility 22 identifies sufficient space to insert a decoupling capacitor (step 82 in FIG. 8) the drive strength facility 22 places the decoupling capacitor to support the selected group of cells that violate a drive strength threshold value (step 86 in FIG. 8). If the drive strength facility 22 determines that sufficient space is not available to insert a decoupling capacitor (step 82 in FIG. 8) the drive strength facility 22 determines whether additional cell groupings that violate a drive strength threshold require examination for open space (step 84 in FIG. 8). If there are cell groupings that exceed a drive strength threshold value still in need of examination to determine their open space constraints, the drive strength facility 22 moves to the next cell grouping requiring review and identifies the open space within the window perimeter for placing a decoupling capacitor (step 84 in FIG. 8). Should the drive strength facility 22 insert the needed decoupling capacitor in support of the cell grouping that violates a drive strength threshold value, the drive strength facility 22 then determines whether there remains other cell groupings that violate a drive strength threshold value requiring review and identification of open space (step 88 in FIG. 8). The drive strength facility 22 will continue to review all cell groupings identified as violating a drive strength threshold and insert the decoupling capacitors where space constraints permit until all flagged cell groupings are reviewed for open space and their space constraints and capacitance are needs are written to the storage element 12.

If the drive strength facility 22 is able to insert a decoupling capacitor in each cell grouping identified as violating a drive strength threshold (step 90 in FIG. 8) the electronic device layout with decoupling capacitors 4 is complete (step 91 in FIG. 8). If all cell groupings identified as violating a drive strength threshold are evaluated for pen space to place a capacitor, but the space is insufficient to place the capacitor (step 84 in FIG. 8 or step 90 in FIG. 8) the drive strength facility 22 passes the collected space constraints and capacitance constraints to the linear optimizer 24 (step 92 in FIG. 8).

The linear optimizer 24 processes the passed space constraints and capacitance constraints in a constraint based equation manner to derive whether all needed decoupling capacitors for the electronic device layout 2 can be inserted given the space constraints and the decoupling capacitance constraints of the electronic device layout 2 (step 94 in FIG. 8). As such, the linear optimizer 24 is able to determine the groups of violating cells that have space in common, that is, which groups of flagged cells can share one or more localized decoupling capacitors based on their proximity to one another. In addition, the linear optimizer 24 is capable of inserting multiple decoupling capacitors in the available space to provide a cumulative decoupling capacitance equal to or greater than the decoupling capacitance needed for an identified group of cells violating a drive strength threshold.

If the linear optimizer 24 determines that sufficient space is available to meet the localized decoupling capacitor needs of the electronic device layout 2 (step 96 in FIG. 8), the linear optimizer 24 inserts the decoupling capacitors in the corresponding open spaces (step 98 in FIG. 8). If the linear optimizer 24 determines that the electronic device layout 2 contains insufficient space to insert all needed decoupling capacitors (step 96 in FIG. 8), the drive strength facility 22 notifies the system operator that the electronic device layout 2 contains insufficient space to insert all needed decoupling capacitors (step 100 in FIG. 8).

At this point, the system operator may choose to expand the electronic device layout boundaries to provide additional area, or may choose to shift cells amongst rows in the layout, or may choose to partition larger cells that have unused open space into two or more smaller cells, in an attempt to provide sufficient space to insert any decoupling capacitors still required in the electronic device layout 2. If the system operator can provide the additional required space, the operator may insert the still needed decoupling capacitors into the electronic device layout 2 by instructing the drive strength facility 22 to insert a decoupling capacitor at a particular coordinate, or alternatively, may allow the drive strength facility 22 to re-evaluate the cells flagged as requiring decoupling capacitors.

While the present invention has been described with reference to an illustrative embodiment thereof, those skilled in the art will appreciate that various changes in form and detail may be made without departing from the intended scope of the present invention as defined in the pending claims. For example, with combinational logic elements that have a ripple-like pattern of switching behavior, these elements may be modeled in further detail as to the timing of the switching and the effects the ripple-like pattern has on the power bus in order to determine the localized decoupling capacitor needs. Moreover, the electronic device layout may be a layout for an integrated circuit or may be a layout for a circuit card assembly. Further, the logical components referred to within may be logical gates or the discrete transistors that are configured to form the logical gates.

What is claimed is:

1. In an electronic device, a method, comprising the steps of:

providing a representation of a layout of the electronic device, wherein said electronic device contains cells and wherein each cell is at least a single logical component and each cell has a drive strength that represents an amperage necessary to drive the logical component of the cell;

identifying groups of cells in the representation located in proximity to each other;

summing the drive strengths of at least some cells in each of the groups of cells to determine a cumulative drive strength for each of the groups of cells; and for each of the groups of cells where the drive strength of the group of cells exceeds a threshold, determining that a decoupling capacitor is needed for the group of cells.

2. The method of claim 1, wherein the method further comprises the step of determining, for each of the group of cells where the drive strength of the group of cells exceeds the threshold, where to position the decoupling capacitor for the group of cells.

3. The method of claim 2, wherein determining where to position the decoupling capacitor for each group of cells where the drive strength of the group of cells exceeds the threshold comprises searching a window of a predetermined size centered around the group of cells in the representation of the layout of the electronic devices to locate available space to insert the decoupling capacitor.

4. The method of claim 3 wherein the electronic device has rows of cells and wherein when there is no available space for placing the decoupling capacitor in the window, searching a row containing the group of cells for available spaces to insert the decoupling capacitor.

5. The method of claim 4 wherein when the row containing the group of cells has available space, shifting cells in the row to create a space to insert a decoupling capacitor.

6. The method of claim 2, wherein the method further comprises the step of verifying the determination where to position the decoupling capacitor for the group of cells to confirm proper space allocation within the electronic device.

7. The method of claim 6, wherein the verification of the determination where to position the decoupling capacitor for the group of cells is a linear optimizer that determines where to position the decoupling capacitor within the electronic device based on available space predominately located in and around the group of cells and the capacitor value of its decoupling capacitor.

8. The method of claim 1 wherein at least one of the cells is a logic gate.

9. The method of claim 1 wherein at least on e of the cells is a flip-flop.

10. The method of claim 1 wherein at least one of the groups of cells contains only components that are active on a first phase of a clock signal.

11. The method of claim 1 wherein at least one of the groups of cells contains only combinational logic elements.

12. The method of claim 1 wherein at least one of the groups of cells contains only components that are active on a second phase of a clock signal.

13. The method of claim 1 wherein the method further comprises the step of choosing a size of the decoupling capacitor based on the summation of the drive strength for a selected cell.

14. The method of claim 1, wherein at least one of the cells comprises a Metal Oxide Semiconductor Field Effect Transistor (MOSFET).

15. The method of claim 1, wherein the electronic device is an integrated circuit.

16. In an electronic device, a method, comprising the steps of:
providing a representation of at least a portion of an integrated circuit, said portion being partitioned into cells wherein each cell is a logical component having a drive strength that represents current for driving the logical component and wherein components may be active during a given phase of a clock signal;
for a given area or the representation containing a group of cells, determining a first cumulative drive strength for the component in the group of cells that are active during a first phase of the clock signal and a second cumulative drive strength for the components in the group of cells that are active during a second phase of the clock signal:
determining that a decoupling capacitor is needed for the group of cells where the first cumulative drive strength exceeds a first threshold; and
determining that a decoupling capacitor is needed for the group of cells where the second cumulative drive strength exceeds a second threshold.

17. The method of claim 16 wherein the method further comprises the steps of:
determining a third cumulative drive strength for combinational logic components in the group of cells; and
determining that a decoupling capacitor is needed for the group of cells where the third cumulative drive strength exceeds a third threshold.

18. The method of claim 16 wherein the method further comprises the steps of:
determining a fourth cumulative drive strength for all of the components in the group of cells;
determining that a decoupling capacitor is needed for the group of cells where the fourth cumulative drive strength exceeds a fourth threshold.

19. The method of claim 16, wherein the method further comprises the step of determining where to insert the needed decoupling capacitor for the group of cells based on a linear optimization of available space in and proximately located about the group of cells and a capacitance value of the needed decoupling capacitor.

20. In an electronic device, a method comprising the steps of:
providing a representation of an integrated circuit containing cells, wherein each cell is a single component having a drive strength that represents a current necessary to drive the logical component of the cell;
sliding a window over the integrated circuit at discrete positions, wherein at each discrete position said window encompasses at least one cell;
for each discrete position of the window
(i) calculating a cumulative drive strength representing a sum of drive strengths for the components of the cells encompassed in the window at the discrete position; and
(ii) where the cumulative drive strength exceeds a threshold, determining that a decoupling capacitor is needed for the cells encompassed in the window at the discrete position.

21. The method of claim 20 wherein the step of determining that a decoupling capacitor is needed comprises determining a size for the decoupling capacitor.

22. The method of claim 20 wherein the method further comprises determining where to position the decoupling capacitor on the integrated circuit.

23. The method of claim 22, wherein the determination where to position the decoupling capacitor on the integrated circuit optimizes open space within said window by placing a plurality of decoupling capacitors in said open space to meet the decoupling capacitor needs for the cells encompassed in the window at the discrete position.

24. A system for determining localized decoupling capacitor requirements of an electronic device comprising:
a display for reviewing a layout of the electronic device by a user;
an input device for use by the user;
a processor for executing instruments in response to input from the input device; and
a drive strength facility for determining the localized decoupling capacitor requirements for the electronic device based on a cell drive strength value wherein the cell represents a single component and the cell drive strength value represents an amperage necessary to drive the component of the cell.

25. The system of claim 24 further comprising, a storage device for storing the cell drive strength value for the component.

26. The system of claim 24, wherein the electronic device is an integrated circuit.

27. The system of claim 24, wherein the electronic device is a circuit card assembly.

28. A computer readable medium holding instructions for performing a method on a computer system, said method, comprising the steps of:
providing a visual representation of an electronic device in a layout format wherein said electronic device contains cells and wherein each cell is one or more logical components and each cell has a drive strength that represents an amperage necessary to drive the one or more logical components of the cell;
identifying groups of cells in the representation located in proximity to each other;
summing the drive strengths of at least some cells in each of the groups of cells to determine a cumulative drive strength for each of the groups of cells; and determining that a decoupling capacitor is needed for the groups of cells having a cumulative drive strength in excess of a value.

29. The medium of claim 28, wherein the method further comprises the step of, determining for each of the group of cells where the drive strength of the group of cells exceeds the value, where to position the decoupling capacitor for the group of cells.

30. The medium of claim 29, wherein the determination where to position the decoupling capacitor for each group of cells where the drive strength of the group of cells exceeds the value comprises searching a window of a predetermined size centered around the group of cells in the visual representation of the layout of the electronic device to locate available space for placement of the decoupling capacitor.

31. The method of claim 30 wherein the determination where to position the decoupling capacitor optimizes space within said window to position a plurality of decoupling capacitors having a cumulative capacitance value equivalent to the decoupling capacitor capacitance value.

32. The medium of claim 28 wherein at least one of the cells is a logic gate.

33. The medium of claim 28 wherein at least one of the cells is a transistor.

34. The medium of claim 28 wherein the cell of the electronic device comprises one of a combinational logic component, a logical component that evaluates during a first phase of a clock signal, a logical component that evaluates during a second phase of the clock signal.

* * * * *